(12) United States Patent
Ertl et al.

(10) Patent No.: US 8,979,340 B2
(45) Date of Patent: Mar. 17, 2015

(54) METHOD AND ARRANGEMENT FOR COUPLING IN RADIATION EMITTED BY LEDS

(75) Inventors: Thomas Ertl, Ranstadt (DE); Johannes Herzig, Radevormwald (DE)

(73) Assignee: Degudent GmbH, Hanau (DE)

( * ) Notice: Subject to any disclaimer, the term of this patent is extended or adjusted under 35 U.S.C. 154(b) by 0 days.

(21) Appl. No.: 13/642,933

(22) PCT Filed: Apr. 20, 2011

(86) PCT No.: PCT/EP2011/056306
§ 371 (c)(1),
(2), (4) Date: Jan. 18, 2013

(87) PCT Pub. No.: WO2011/131710
PCT Pub. Date: Oct. 27, 2011

(65) Prior Publication Data
US 2013/0114286 A1    May 9, 2013

(30) Foreign Application Priority Data
Apr. 23, 2010   (DE) .......................... 10 2010 016 622
Jul. 19, 2010   (DE) .......................... 10 2010 036 496

(51) Int. Cl.
A61B 1/06    (2006.01)
A61C 1/00    (2006.01)
(Continued)

(52) U.S. Cl.
CPC ............ *G02B 6/4298* (2013.01); *G02B 6/3504* (2013.01); *G02B 6/352* (2013.01); *G02B 6/3524* (2013.01); *G02B 6/3526* (2013.01); *G02B 6/3528* (2013.01)
USPC ......................................... 362/573; 362/555

(58) Field of Classification Search
CPC .. G02B 6/0008; G02B 6/0066; G02B 6/0075; G02B 6/04; G02B 21/20; G02B 6/3504; G02B 6/352; G02B 6/3524; G02B 6/3526; G02B 6/3528; G02B 6/4298; A61B 1/24; A61B 1/273; A61B 1/2733; A61B 1/2736

USPC .................... 362/574, 575, 249.02, 554–556, 362/572–573; 353/94, 85, 97, 30
See application file for complete search history.

(56) References Cited

U.S. PATENT DOCUMENTS 4,917,487 A * 4/1990 Cruickshank ................... 353/28
6,525,819 B1 * 2/2003 Delawter et al. .............. 356/406
(Continued)

FOREIGN PATENT DOCUMENTS

CN    201088639 Y    7/2008
CN    101688771 A    3/2010
(Continued)

OTHER PUBLICATIONS

Chinese Search Report issued Apr. 22, 2014, corresponding to Chinese Patent Application No. 201180020508.2.
(Continued)

*Primary Examiner* — Jason Moon Han
(74) *Attorney, Agent, or Firm* — Ladas & Parry LLP

(57) ABSTRACT

A method and arrangement for transmitting radiation emitted by LEDs operated in pulsed operation via at least one optical waveguide, wherein a first optical waveguide having first and second coupling surfaces is assigned to each LED, the first optical waveguides are in each case aligned, by their first coupling surfaces, with an assigned stationary LED, the second coupling surfaces are arranged on a closed path and a coupling surface of a second optical waveguide is assigned to the second coupling surfaces. In order that a high light power can be coupled into the second optical waveguide by means of the LEDs, it is provided that the second optical waveguide, in accordance with the clocking of the switched-on LEDs, can be aligned with the second coupling surface of a first optical waveguide from at least one switched-on LED.

20 Claims, 3 Drawing Sheets

(51) Int. Cl.
  *A61C 3/00* (2006.01)
  *F21V 5/00* (2006.01)
  *G01J 1/00* (2006.01)
  *G02F 1/00* (2006.01)
  *G02B 6/42* (2006.01)
  *G02B 6/35* (2006.01)

(56) References Cited

U.S. PATENT DOCUMENTS

| | | | |
|---|---|---|---|
| 7,237,910 B2* | 7/2007 | Kumai | 353/97 |
| 7,252,392 B2* | 8/2007 | Matsui | 353/85 |
| 2004/0090602 A1* | 5/2004 | Imade | 353/102 |
| 2005/0128436 A1 | 6/2005 | Matsui | |
| 2010/0098399 A1 | 4/2010 | Breish et al. | |
| 2011/0313254 A1* | 12/2011 | Godo | 600/178 |

FOREIGN PATENT DOCUMENTS

| | | |
|---|---|---|
| EP | 1413919 A1 | 4/2004 |
| EP | 1 602 962 | 12/2005 |
| JP | 08031281 | 2/1996 |
| JP | 2000-330042 A | 11/2000 |
| JP | 2004-039285 A | 2/2004 |
| JP | 2004-199024 A | 7/2004 |
| JP | 2006-218104 A | 8/2006 |
| JP | 2007-513378 A | 5/2007 |
| JP | 2008-288307 A | 11/2008 |

OTHER PUBLICATIONS

Japanese Office Action mailed Dec. 2, 2014, corresponding to Japanese Patent Application 2013505471.

\* cited by examiner

Fig. 1
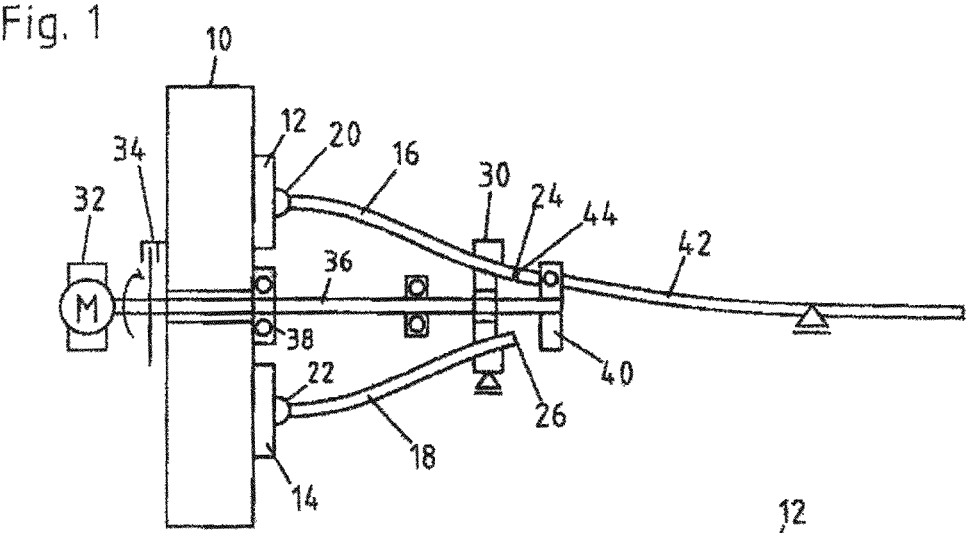
Fig. 2
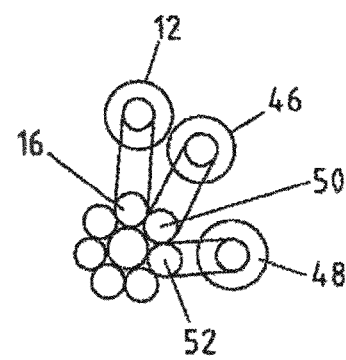
Fig. 3
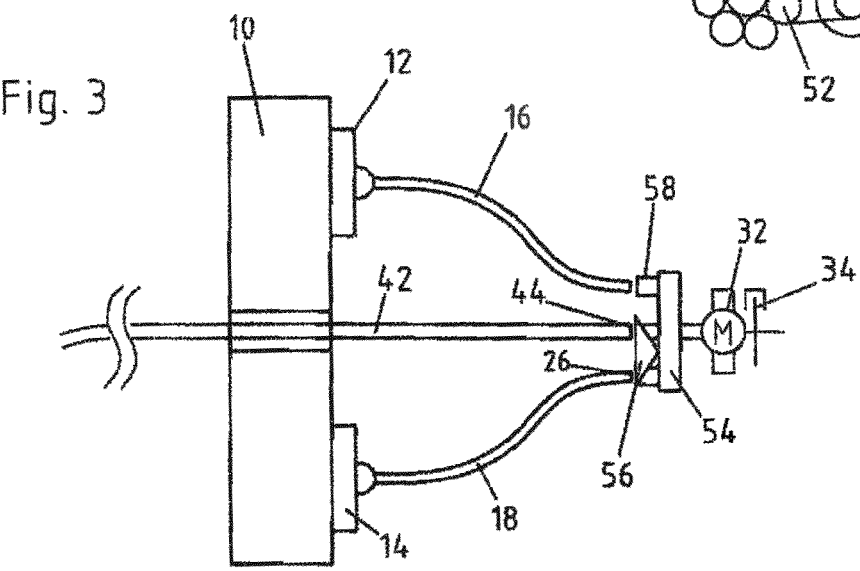
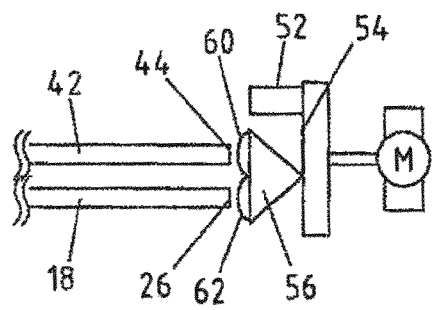
Fig. 4

METHOD AND ARRANGEMENT FOR COUPLING IN RADIATION EMITTED BY LEDS

This application is a 371 of PCT/EP2011/056306 filed on Apr. 20, 2011, which claims priority to German patent application number 10 2010 016 622.7, filed Apr. 23, 2010, and German patent application number 10 2010 036 496.7, filed Jul. 19, 2010.

BACKGROUND OF THE INVENTION

The invention relates to a method for coupling radiation emitted by a multitude of LEDs into a fiber-optic light guide, whereby each LED is being arranged stationary, to each LED is assigned a first fiber-optic light guide with first and second coupling surfaces, light is coupled in via a first coupling surface of each of the first fiber-optic light guides from one of the LEDs, and the radiation of the respective activated LED emerging from the second coupling surfaces is transmitted onto a coupling surface of a second fiber-optic light guide. The invention further relates to an arrangement for transmission of radiation emitted by pulse-controlled LEDs via at least one fiber-optic light guide, whereby assigned to each LED is a first fiber-optic light guide with first and second coupling surfaces, each of the first fiber-optic light guides are oriented with their first coupling surfaces towards an associated stationary LED, the second coupling surfaces are arranged on a closed track or are arranged according a grid pattern, and associated with the second coupling surfaces is a coupling surface of a second fiber-optic light guide.

Light sources to be coupled into fiber-optic bundles or optical fibers at present employ either halogen lamps or xenon lamps. Both of these have in common a low efficiency and a correspondingly high power consumption.

Even though white-light LEDs have achieved considerable power levels, their achievable energy density is still significantly lower than that of a xenon lamp, for example. On the one hand this is due to the comparatively large spatial extent of the light-generating surface, and to the wide emission angle on the other, which complicates efficient coupling into fibers or fiber bundles. Even though it is possible to move an optical fiber very close to the chip of the LED or use an imaging optical system, the power density often is not sufficient.

Tapers for the purpose of improving the coupling efficiency often have the disadvantage of further increasing the aperture angle whereas dichroic beam combiners suffer from the drawback of only being useable for combining selective wavelength regions.

For this reason tasks that require high light output that is to be coupled into optical fibers can not be accomplished using LEDs.

US-A-2008/0310181 relates to a high-brightness illumination system to be used in an endoscopic camera. The arrangement comprises groups of blue, green, and red light-emitting diodes, the light of which is transmitted via optical fibers onto a transmission bundle and subsequently is transmitted via a mixer onto an optical bundle 2, in order to subsequently be able to use the light for the endoscopic camera.

The subject matter of U.S. Pat. No. 5,109,447 is a wide-band-signal light source. For this is provided a waveguide coupler, which transmits signals that are transmitted by fiber-optic light guides assigned to a multitude of LEDs to a second fiber-optic light guide, which possesses a wide-band output.

In an illumination device in accordance with US-A-2005/0046807 light from LEDs arranged in a circle is transmitted to a second fiber-optic light guide that is oriented towards an LCD.

DE-U-20 2008 006 191 relates to an arrangement for the use of light-emitting diodes for high-capacity illumination purposes. In this one uses a multitude of light-emitting diodes, whereby to each LED is assigned a first coupling surface of a fiber-optic light guide. The second coupling surfaces of the fiber-optic light guides then are combined in a cable-like fashion in a light-guide unit, in order to form a light-emitting area.

It is the objective of the present invention to further develop a method and an arrangement of the above-mentioned type in a way that allows coupling high light-output power into a fiber-optic light guide by means of LEDs. In this, the aim is to create the option of achieving a power output with any desired amplitude of fluctuations of the luminous intensity, while keeping the constructional complexity low. A further objective of the invention is the minimization of dead times and the simplification of the power supply circuit to the LEDs.

With respect to the method, the objective is essentially met by the LEDs being operated in a pulsed and sequential manner and by the second coupling surfaces being arranged on a closed track, along which is moved the second fiber-optic light guide with its coupling surface or an optical system oriented towards the coupling surface of the stationary second fiber-optic light guide.

The invention utilizes the property of LEDs, particularly of white-light LEDs, that LEDs can be operated in a pulsed manner at power levels that are higher by a factor of 50 or more in comparison to the admissible current during continuous-wave operation. Consequently an LED such as a white-light LED can—when operated in correspondingly short pulses—be operated at a high pulse power while maintaining the average power output for a corresponding duty cycle.

In order to avoid unnecessary dead times and to avoid in particular collector rings to supply power to the LEDs, the invention intends that the LEDs be arranged in a stationary fashion. Associated with the first fiber-optic light guides, which are associated with the LEDs, is a second fiber-optic light guide, which either is stationary or with its coupling surface can be aligned to the second coupling surfaces of the first fiber-optic light guides in a manner so that an alignment is achieved relative to the one fiber-optic light guide, possibly two neighboring fiber-optic light guides, of LEDs that are under power and consequently emit light, in particular to the desired extent and according to the clock rate of the active LEDs.

In other words, one uses any desired number of LEDs, whereby their light is sequentially coupled into first fiber-optic light guides, such as optical fibers or fiber bundles, so that the output power can be increased by a factor of 50 or more.

Another option would be to arrange LEDs on a rotating wheel and to generate a light pulse with an LED at precisely the time when this LED is located opposite to the fiber-optic light guide that is stationary. This however would create unnecessary dead times. The required collector rings for the power supply to the LEDs represent another disadvantage.

The invention's teaching results in the minimization of dead times, the lack of collector rings, and the option of generating an extremely uniform power output or controlled pulses in a defined time pattern. Hereby one also has the option of synchronizing the time base to the frame rate of a recording unit such as a CCD camera.

According to the invention's teaching, the first fiber-optical light guides are arranged in a manner so that to each LED is connected a first fiber-optic light guide, such as a short piece of optical fiber. This can be achieved by directly placing it in proximity of the chip surface of the LED. This creates the possibility of arranging the first fiber-optic light guides in a circular pattern as tightly spaced as possible, whereby the coating of the fiber-optic light guides can be removed at least in the area of the second coupling surfaces, in order to reduce dead times. Associated with the corresponding first fiber-optic light guides, e.g. optical fibers, then is a second fiber-optic wave guide, to transmit the pulsed radiation of the individual fiber-optic light guides. The high-power-density light can for example be used to illuminate an object to be scanned, such as a tooth or a jaw section.

The length of the fiber-optic light guides should be chosen to prevent tight bending radii wherever possible.

One has the option of guiding the second fiber-optic light guide along the second coupling surfaces of the first fiber-optic light guides, whereby this is synchronized to the sequentially activated LEDs. For example, the second fiber-optic light guide with its coupling surface may be moved along a circular path, whereby the second coupling surface of a first fiber-optic light guide of an activated LED at the time of the activation will be centered opposite to the coupling surface of the second fiber-optic light guide.

Instead of a movable second fiber-optical light guide, one also can arrange the latter in a stationary position, whereby for coupling-in the pulsed radiation one uses an optical deviating element, which accordingly is moved along the second coupling surfaces of the first fiber-optic light guides in order to subsequently couple the light into the second fiber-optic light guide. The optical deviating element such as a deviating prism may be arranged on a rotating support in order to redirect the light of the first fiber-optic light guide into the second fiber-optic light guide.

Deviating from the circular pattern, the second coupling surfaces may also be positioned in a grid pattern, to sequentially couple the radiation into the second fiber-optic light guide by means of minors, rotating prism wheels, or combinations of suitable optical coupling means.

When the coupling surface of the second fiber-optic light guide is moving past the second coupling surfaces of the first fiber-optic light guides, the coupling losses are variable and will be dependent on the position of the second fiber-optic light guide moving relative to the first fiber-optic light guides. The same applies for coupling optics that can be moved relative to the first fiber-optic light guides.

To be able to achieve as uniform a power output as possible despite this, the invention intends as a further development that two neighboring LEDs at a time be activated simultaneously. As a result of this, neighboring LEDs are activated when the coupling surface of the second fiber-optic light guide partially optically covers the first fiber-optic light guide associated with the activated LEDs, i.e. is in a position facing them. The remaining ripple can be eliminated by a compensating modulation of the LED current. This may be achieved using either an open-loop or closed-loop control method.

However, a pulsed operation is also possible. In order to achieve maximum coupling efficiency it is possible in the time period just before until just after the optimal coupling point, i.e. when the second coupling surface is directly opposite to the coupling surface of the second fiber-optic light guide, to generate a short light pulse from an LED that may be synchronized with the light integration time of a sensor.

Independently hereof, the invention in particular intends that the second coupling surfaces be arranged on a closed track, along which is moved the second fiber-optic light guide with its coupling surface or an optical system aligned with the coupling surface of the stationary second fiber-optic light guide.

Furthermore, to ensure optimal coupling-in of light, the second coupling surfaces of the first fiber-optic light guides should be aligned parallel relative to the coupling surface of the second fiber-optic light guide.

An arrangement of the above-mentioned type is characterized in particular by the fact that the second fiber-optic light guide can—in accordance with the clocking of the active LEDs—be oriented towards the second coupling surface of a first fiber-optic light guide of at least one active LED, or that an optical deviating element can be aligned with the second coupling surface of a first fiber-optic light guide of an associated activated LED, whereby the optical deviating element directs the radiation onto the coupling surface (44) of the stationary second fiber-optic light guide.

In particular, the LEDs should be arranged on a heat sink serving as a mount, whereby Peltier elements may be present for the elimination of heat.

The number of LEDs may be between 2 and 100.

Preferably the first fiber-optic light guides with their coupling surfaces are arranged on a circular path, along which the coupling surface of the second fiber-optic light guide can be moved, whereby the second coupling surfaces of the first fiber-optic light guides are oriented in parallel to the coupling surface of the second fiber-optic light guide.

For the purpose of reducing dead times, it is intended that the coating of the first fiber-optic light guides has been removed in at least the region of the second coupling surfaces.

If the second fiber-optic light guide is moveable relative to the first fiber-optic light guides, it is suggested that the second fiber-optic light guide be accommodated in a mounting element, which is rotatable about an axis that passes through the mount—such as an annular disk—for the LEDs, whereby the second coupling surfaces preferably are inclined relative to the axis.

For a stationary second fiber-optic light guide, the coupling-in from the first fiber-optic light guides may be achieved via an optical deviating element such as a deviating prism, which is attached to a rotatable mount. The optical deviating element may originate from a rotating disk that is rotatable about an axis, which passes through the LED mount and along which the second fiber-optic light guide extends at least in the area of the optical deviating element.

In order to allow optimal coupling and decoupling it is intended that on the base surface of the deviating prism the second coupling surface of at least one first fiber-optic light guide associated with an activated LED and the coupling surface of the second fiber-optic light guide be aligned, whereby preferably arranged on the base surface are lenses to focus the radiation.

BRIEF DESCRIPTION OF THE DRAWINGS

Further details, advantages, and features of the invention are not only found in the claims, the characteristic features described therein—either individually and/or in combination—but also in the following description of preferred embodiment examples illustrated in the figures.

FIG. 1 shows a first embodiment variant of an arrangement for transmission of pulse-controlled LEDs, FIG. 2 shows a schematic illustration of an arrangement of first and second fiber-optic light guides, FIG. 3 shows a second embodiment variant of an arrangement for transmission of pulse-controlled LEDs, FIG. 4 shows a section of a configuration of the arrangement of FIG. 3.

DETAILED DESCRIPTION OF THE INVENTION

Figure 5:
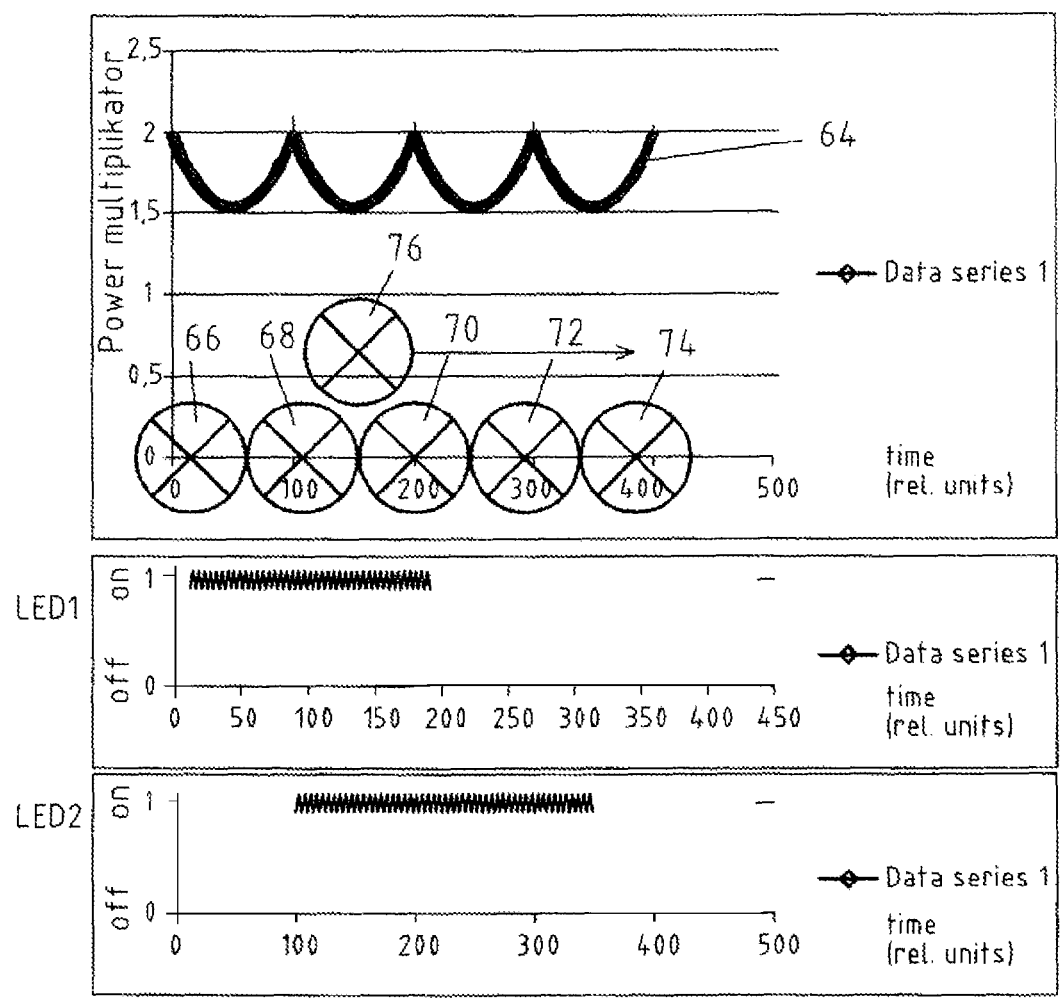
FIG. 5 shows a schematic illustration of continuous power output.

For the purpose of obtaining light from high-intensity LEDs (light-emitting diodes) the invention intends that LEDs, in particular white light LEDs, be operated in a pulse-controlled manner. This creates the possibility of increasing the power output by a factor of up to 50 or more, compared to the permissible current during continuous-wave operation. The radiation emitted by the pulse-controlled LEDs subsequently—via first fiber-optic light guides—is coupled into a second fiber-optic light guide, from which the high-power radiation subsequently is directed to illuminate in particular a dental object, which is to be scanned.

FIG. 1 shows a first arrangement for generating such a high-power LED radiation. On a heat sink 10, which may comprise Peltier elements for better heat-dissipation, i.e. cooling, LEDs 12, 14 are arranged in a circle. Assigned to each LED 12, 14 is a first fiber-optic light guide 16, 18, such as a short piece of optical fiber, which in particular may be glass fibers or polymer optical fibers. The fiber-optic light guides 16, 18 are equipped with a coating. The first fiber-optic light guide 16, 18 is embodied as a short piece of optical light-guiding fiber, which is sufficiently long to allow a double turn of the optical fiber given its minimum bending radius. The length of the fiber-optic light guide 16, 18 preferably is in a range between 5 cm and 15 cm, whereby the length is dependent on the minimum bending radius of the optical fiber. If for example the LEDs 12,14 are situated on a circle with a diameter R=10 cm and if the minimum bending radius of the optical fiber is 5 cm, one would require a fiber length of 15 cm. In the case of the radius of the circle on which the LEDs are arranged being R=5 cm and the minimum bending radius of the optical fiber being 1 cm, one would require an optical fiber with a fiber length of 5 cm.

The first fiber-optic light guide 16, 18 may have a diameter in the range between 200 µm and 1 mm. The preferred material is $SiO_2$, with a numerical aperture NA in the range between 0.15 and 0.4. The fiber-optic light guide 16, 18 may comprise a silica core with silica cladding. Alternatively one may employ HCS (Hard Clad Silica) fibers, i.e. a fiber-optic light guide with a silica glass core and a cladding of a special plastic. HCS fibers of this type are available from Laser Components GmbH, for example.

Naturally it is still within the scope of the invention, if the LEDs 12, 14 are not arranged on a body comprising Peltier elements serving as a mount.

The fiber-optical light guides 16,18 possess first coupling surfaces 20, 22 that are aligned directly towards the respective LED 12, 14 and second coupling surfaces 24, 26 situated at the other end of the fiber-optic light guide 16, 18. The coating may have been removed in the area of the second coupling surfaces 24, 26. This may reduce dead times. The first coupling surfaces 20, 22 should be attached immediately at the chip surface.

The fiber-optical light guides 16, 18 in the region of the second coupling surfaces 24, 26 are fastened via a mount 30.

A motor 32 with position encoder 34 drives a shaft 36 passing through a bearing 38 and through the discoid heat sink 10. Mounted on the shaft 36 is a rotating disk 40, which accommodates a second fiber-optic light guide 42 with one coupling surface 44, that is aligned relative to the second coupling surfaces 24, 26 of the first fiber-optic light guide in such as way that the coupling surfaces extend nearly parallel to each other and preferably are inclined relative to the longitudinal axis of the shaft 36. The movement of the rotating disk, and thus the motion of the coupling surface 44 of the second fiber-optic light guide 42, are synchronized in such a manner that the coupling surface 44 is facing a second coupling surface 24, 26 when current passes through the LED of the corresponding first fiber-optic light guide, i.e. when the LED is activated. The second fiber-optic light guide 42 possesses a diameter in the range between 200 µm and 1 mm and preferably consists of $SiO_2$ with a numerical aperture NA in the region between 0.15 and 0.4. The second fiber-optic light guide preferably possesses a silica core with silica cladding. Alternatively one may use HCS (Hard Clad Silica) fibers, as was already mentioned above.

During the rotation of the rotating disk 40, the coupling surface 44 of the fiber-optic light guide 42 should pass within the lowest possible distance from the second coupling surface 24, 26 of the first fiber-optic light guides 16, 18, to keep coupling losses at a minimum. Preferably this distance is only limited by the manufacturing tolerances of the optical fibers, since a grinding contact between the coupling surfaces and fiber ends must be safely ruled out. This distance should be in a range between 10 µm and 200 µm.

The above-described arrangement of the first fiber-optic light guides 16, 18 is also illustrated in FIG. 2. Apparent in the figure are the LEDs 12, 46, 48, which are arranged on a circle and from which originate first fiber-optic light guides 16, 50, 52.

FIGS. 3 and 4 illustrate a second embodiment variant of an arrangement for the transmission of radiation generated by pulse-controlled LEDs, whereby relative to FIGS. 1 and 2, the same reference labels are used for identical elements. The pulse-controlled LEDs exhibit a pulse/pause ratio of less than 1. Consequently, the ON time, i.e. the time during which the LED/LEDs is/are switched on, is shorter than the OFF times between the ON times. In dependence on the sensor's integration time and the number of LEDs as well as the tolerable level of variations of the light output at the exit of two optical fibers, one adjusts the pulse duration preferably in a range between 1 µs and 100 ms. For example, should the pulse peak power exceed the continuous-wave rating of the LED by for example a factor 10, then the pulse/pause ratio should definitely be smaller than 0.1, so that the mean power output does not exceed the permissible continuous-wave rating.

As was shown for the embodiment example in FIG. 1, light-emitting diodes 12, 14 are arranged on the heat sink 10. However, different from the embodiment example of FIG. 1, the second fiber-optic light guide 54 is not accommodated on a rotating disk 44, but is arranged in a stationary fashion. To be able to couple in the LED radiation, a turning disk is provided, on which is arranged a deviating prism 56, via which the radiation conducted by the first fiber-optic light guides 16, 18 is coupled into the coupling surface 44 of the second fiber-optic light guide 42. It is apparent that the deviating prism 56 deflects the radiation emerging from the second coupling surface 26 of the first fiber-optic light guide 18 onto the coupling surface 44 of the second fiber-optic light guide 42.

The rotating disk 56 preferably possesses a balancing weight 58 to facilitate a uniform motion. The rotating disk is driven by the motor 32, with which is associated the position encoder 34 as shown in FIG. 1.

The second fiber-optic light guide 42 of the embodiment example passes centrally through the mounting disk 10.

For the purpose of achieving improved focusing of the radiation to be coupled and decoupled, focusing lenses 60, 62 may in accordance with FIG. 4 be arranged on the deviating prism 56 to couple the radiation from the first fiber-optic light guide 18 with extremely low losses into the second fiber-optic light guide 42.

Figure 6:
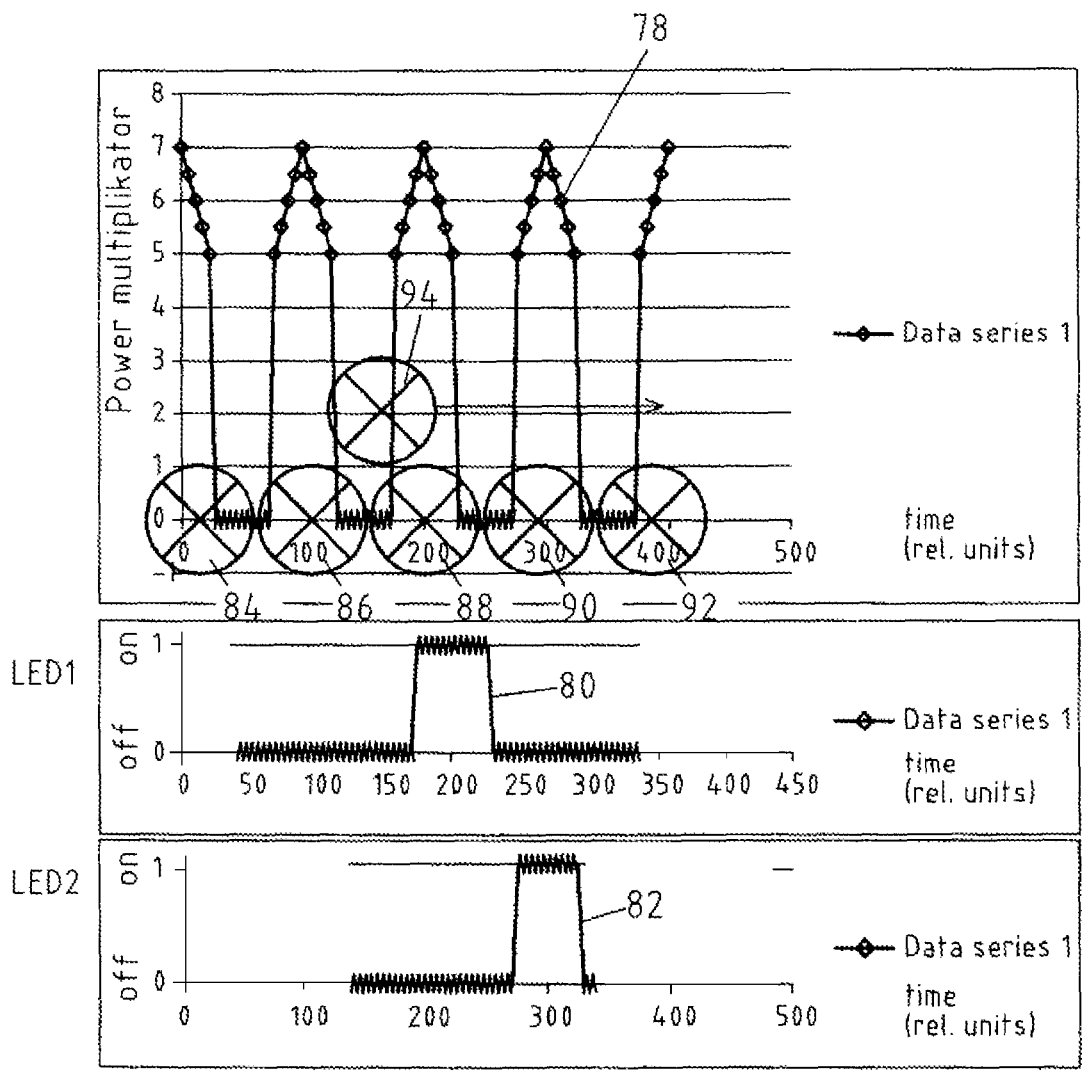
FIG. 6 shows a schematic illustration of a pulsed operating mode.

FIGS. 5 and 6 illustrate the operating modes of the arrangements according to the invention. FIG. 5 illustrates as an example the clocking of the power source for each LED and the resulting output power as a function of time in the second fiber-optic light guide 42. The output power is illustrated by the upper curve 64. It is apparent that the output signal is very uniform. In order to achieve this, pairs of two adjacent fiber-optic light guides are illuminated by the corresponding LEDs, so that during the transition from one first fiber-optic light guide to the adjacent fiber-optic light guide the drop in light intensity is not too severe. This however reduces by half the achievable duty cycle. The first fiber-optic light guides carry the reference labels 66, 68, 70, 72, 74 while the passing second fiber-optic light guide is labeled 76.

FIG. 6 illustrates both the pulsed operation and the time behavior of the power output in the second fiber-optic light guide, which is represented by the upper curve 78. As is illustrated for the triggering of neighboring LEDs (curves 80, 82), one of the LEDs 84, 86, 88, 90, 92 is switched on at the moment when such an optimum overlap with the second fiber-optic light guide 94 is present. In this manner, it becomes possible—in accordance with the embodiment example in FIG. 6—to significantly reduce the operating time of the individual LEDs 84, 86, 88, 90, 92 and correspondingly to increase the peak power output, as is illustrated by curve 78.

The invention claimed is:

1. A method for illuminating a dental object with high intensity light, whereby
    radiation emitted by a plurality of LEDs is coupled into a fiber-optic light guide,
    each LED is arranged in a stationary manner on a first circle having a first diameter,
    each LED is assigned to a stationary first fiber-optic light guide in a form of an arcuate optical fiber with first and second coupling surfaces, wherein the second coupling surfaces are arranged on a second circle with a second diameter,
    radiation from each one of the LEDs is coupled in via the first coupling surface into the first fiber-optic light guide,
    the radiation of the LEDs emerging from the second coupling surfaces of the first fiber-optic light guide is transmitted onto a coupling surface of a second fiber-optic light guide,
    the radiation emerging from the second fiber-optic light guide is used to illuminate the dental object to be measured,
    wherein the LEDs are operated in a pulsed manner with a pulse duration between 1 μs and 100 ms and a pulse/pause ratio of less than 1 and are activated sequentially;
    wherein the second coupling surfaces of the first fiber-optic light guide are arranged on a closed circular track, along which is moved the second fiber-optic light guide with its coupling surface or an optical system oriented towards the coupling surface of the stationary second fiber-optic light guide,
    wherein for a moving second fiber-optic light guide, the second coupling surface is rotated about an axis, and
    wherein for a stationary second fiber-optic light guide, the optical system is moved about the axis, and
    wherein the first circle and the second circle intersect the axis in different planes.

2. The method of claim 1, characterized in that the second coupling surfaces of the first fiber-optic light guides are aligned in parallel to the coupling surface of the second fiber-optic light guide.

3. The method of claim 1, characterized in that the movement of the second fiber-optical light guide is synchronized with the clocking of a power source, which is used to activate the LEDs in a sequential fashion.

4. The method of claim 1, characterized in that the coupling surface of the second fiber-optical light guide is oriented towards the second coupling surfaces of the first fiber-optic light guides of two LEDs that are activated at the same time.

5. The method of claim 1, characterized in that the second coupling surfaces are arranged in a grid pattern, and that the radiation conducted via the first fiber-optic light guides is directed via at least one optical deviating element onto the second fiber-optic light guide.

6. The method of claim 1, characterized in that at least one optical deviating element is moved to transmit the radiation.

7. The method of claim 1, characterized in that light transmitted via the second fiber-optic light guide is incident on an object, whereby radiation reflected by the object is measured with an optical sensor, and the time sequence of the activated LEDs is synchronized with the frame rate of the optical sensor.

8. The method of claim 7, characterized in that the optical sensor is a CCD camera.

9. An arrangement for transmission via at least one first fiber-optic light guide of radiation emitted by pulse-controlled LEDs, with the arrangement comprising LEDs, fiber-optic light guides, as well as a dental object to be measured, whereby
    assigned to each of the LEDs is a stationary and arcuate first fiber-optic light guide with first and second coupling surfaces, whereby the first coupling surfaces are arranged on a first circle with a first diameter,
    each of the first fiber-optic light guides with their first coupling surfaces are oriented towards an LED,
    the second coupling surfaces are arranged on a second circle forming a closed circular track with a second diameter, and
    associated with the second coupling surfaces is a coupling surface of a second fiber-optic light guide, whereby the first diameter is greater than the second diameter, characterized in that:
    the second fiber-optic light guide is rotatable about an axis and is alignable in accordance with the timing of active LEDs relative to the second coupling surface of the first fiber-optic light guide, in the form of a curved optical fiber, of at least one active LED, or,
    wherein an optical deviating element is rotatable about an axis and is alignable relative to the second coupling surface of the first fiber-optic light guide of an associated active LED, and the optical deviating element directs the radiation onto the second coupling surface of a stationary second fiber-optic light guide,
    wherein the first and the second circle intersect the axis in different planes, and
    wherein the output of the second fiber-optic light guide is oriented towards the object.

10. The arrangement of claim 9, characterized in that the LEDs are arranged on a mount.

11. The arrangement of claim 10, characterized in that the LEDs are arranged on a circular track.

12. The arrangement of claim 10, characterized in that the LEDs are arranged on a heat sink.

13. The arrangement of claim 9, characterized in that the first fiber-optical light guides with their second coupling surfaces are arranged on a circular track along which is able to be moved the coupling surface of the second fiber-optic light guide, whereby the second coupling surfaces of the first fiber-optic light guides are arranged parallel to the coupling surface of the second fiber-optic light guide.

14. The arrangement of claim 9, characterized in that the coating of the first fiber-optical light guides is removed at least in the area of the second coupling surfaces.

15. The arrangement of claim 9, characterized in that the second fiber-optical light guide is accommodated in a mounting element, which is rotatable about an axis that passes through the mount, whereby the two coupling surfaces extend inclined relative to the axis.

16. The arrangement of claim 9, characterized in that the optical deviating element is a deviating prism, which is able to transfer the radiation onto the stationary second fiber-optic light guide.

17. The arrangement of claim 9, characterized in that the optical deviating element originates from a rotating disk, which is rotatable about an axis passing through the mount of the LEDs, and along this axis extends the second fiber-optic light guide at least in the region of the optical deviating element.

18. The arrangement of claim 9, characterized in that oriented towards the base area of the deviating prism is at least the second coupling surface of at least one first fiber-optic light guide, which is associated with an activated LED, and the coupling surface of the second fiber-optic light guide.

19. The arrangement of claim 9, characterized in that the mount is an annular disk.

20. The arrangement of claim 9, characterized in that the radiation-focusing lenses are arranged on the base surface.

* * * * *